United States Patent
Tanaka et al.

(10) Patent No.: US 8,859,147 B2
(45) Date of Patent: *Oct. 14, 2014

(54) NON-AQUEOUS SECONDARY BATTERY

(71) Applicant: Hitachi Maxell, Ltd., Ibaraki (JP)

(72) Inventors: Naokage Tanaka, Ibaraki (JP); Akira Inaba, Ibaraki (JP); Masayuki Yamada, Ibaraki (JP); Masayuki Yoshiya, Ibaraki (JP)

(73) Assignee: Hitachi Maxell, Ltd., Ibaraki-Shi, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/915,405

(22) Filed: Jun. 11, 2013

(65) Prior Publication Data

US 2013/0273439 A1    Oct. 17, 2013

Related U.S. Application Data

(62) Division of application No. 13/511,084, filed as application No. PCT/JP2011/070743 on Sep. 12, 2011, now Pat. No. 8,481,212.

(30) Foreign Application Priority Data

Sep. 14, 2010 (JP) .................... 2010-205534

(51) Int. Cl.
*H01M 4/583* (2010.01)
*H01M 4/131* (2010.01)
(Continued)

(52) U.S. Cl.
CPC ............. *H01M 4/131* (2013.01); *H01M 4/366* (2013.01); *H01M 4/133* (2013.01); *H01M 4/587* (2013.01); *H01M 10/052* (2013.01); *Y02E 60/122* (2013.01); *Y02T 10/7011* (2013.01); *H01M 4/483* (2013.01); *C01B 33/113* (2013.01)
USPC ......... 429/231.8; 429/220; 429/221; 429/223; 429/231.1; 429/231.6; 429/231.9; 429/338

(58) Field of Classification Search
USPC .......... 429/218.1, 231.4, 231.7, 231.8, 231.1, 429/231.2, 231.3, 231.5, 231.6
See application file for complete search history.

(56) References Cited

U.S. PATENT DOCUMENTS

2003/0129494 A1* 7/2003 Kaneda et al. ............. 429/231.1
2003/0215711 A1  11/2003 Aramata et al.
(Continued)

FOREIGN PATENT DOCUMENTS

EP    1 323 783 A2    7/2003
EP    2 088 221 A1    8/2009
(Continued)

OTHER PUBLICATIONS

International Search Report for PCT/JP2011/070743 dated Nov. 22, 2011.
(Continued)

*Primary Examiner* — Muhammad Siddiquee
(74) *Attorney, Agent, or Firm* — Birch, Stewart, Kolasch & Birch, LLP

(57) ABSTRACT

The non-aqueous secondary battery of the present invention includes a positive electrode, a negative electrode, a non-aqueous electrolyte, and a separator, the negative electrode contains a negative electrode active material containing a graphitic carbon material and a composite in which a carbon coating layer is formed on a surface of a core material containing Si and O as constituent elements, the composite has a carbon content of 10 to 30 mass %, the composite has an intensity ratio $I_{510}/I_{1343}$ of a peak intensity $I_{510}$ at 510 cm$^{-1}$ derived from Si to a peak intensity $I_{1343}$ at 1343 cm$^{-1}$ derived from carbon of 0.25 or less when a Raman spectrum of the composite is measured at a laser wavelength of 532 nm, and the half-width of the (111) diffraction peak of Si is less than 3.0° when the crystallite size of an Si phase contained in the core material is measured by X-ray diffractometry using CuKα radiation.

4 Claims, 2 Drawing Sheets

(51) Int. Cl.
    *H01M 4/133*     (2010.01)
    *H01M 4/134*     (2010.01)
    *H01M 4/36*      (2006.01)
    *H01M 4/587*     (2010.01)
    *H01M 10/052*    (2010.01)
    *H01M 4/48*      (2010.01)
    *C01B 33/113*    (2006.01)

(56) References Cited

U.S. PATENT DOCUMENTS

| | | |
|---|---|---|
| 2005/0233213 A1 | 10/2005 | Lee et al. |
| 2006/0166098 A1 | 7/2006 | Tabuchi et al. |
| 2006/0216607 A1 | 9/2006 | Takeuchi et al. |
| 2008/0081261 A1* | 4/2008 | Takahashi ............... 429/331 |
| 2008/0166634 A1 | 7/2008 | Kim et al. |
| 2009/0162750 A1 | 6/2009 | Kawakami et al. |
| 2009/0311606 A1* | 12/2009 | Fukuoka et al. ......... 429/231.95 |
| 2009/0325058 A1 | 12/2009 | Katayama et al. |
| 2010/0167131 A1* | 7/2010 | Kim et al. ................ 429/338 |
| 2010/0203392 A1 | 8/2010 | Yamada et al. |
| 2011/0111280 A1* | 5/2011 | Tamakoshi et al. .......... 429/144 |

FOREIGN PATENT DOCUMENTS

| | | |
|---|---|---|
| EP | 2 104 175 A2 | 9/2009 |
| JP | 2003-308828 A | 10/2003 |
| JP | 2003-331922 A | 11/2003 |
| JP | 2004-47404 A | 2/2004 |
| JP | 2004-146292 A | 5/2004 |
| JP | 2004-349164 A | 12/2004 |
| JP | 2005-259697 A | 9/2005 |
| JP | 2008-210618 A | 9/2008 |
| JP | 2009-164104 A | 7/2009 |
| JP | 2009-245918 A | 10/2009 |
| JP | 2009-272153 A | 11/2009 |
| JP | 2009-301935 A | 12/2009 |
| JP | 2010-67359 A | 3/2010 |
| JP | 2011-100745 A | 5/2011 |
| WO | WO 2009/157507 A1 | 12/2009 |

OTHER PUBLICATIONS

Notice of Allowance for corresponding Japanese Patent Application No. 2012-524958, dated Jul. 3, 2012.
Extended European Search Report for European Application No. 11825129.7 dated Jan. 30, 2014.

* cited by examiner

NON-AQUEOUS SECONDARY BATTERY

CROSS-REFERENCE TO RELATED APPLICATIONS

This application is a Continuation of U.S. application Ser. No. 13/511,084, which is now U.S. Pat. No. 8,481,212, filed on May 21, 2012, which is a National Phase application of PCT/JP2011/070743 filed on Sep. 12, 2011, which claims priority under 35 U.S.C. §119(a) to Patent Application No. 2010-205534 filed in Japan on Sep. 14, 2010. The entire contents of all of the above applications are hereby incorporated by reference.

TECHNICAL FIELD

The present invention relates to a non-aqueous secondary battery having good storage characteristics.

BACKGROUND ART

Non-aqueous secondary batteries, including lithium ion secondary batteries, provide high voltage and high capacity, and therefore are widely used as power sources for various portable devices. Moreover, in recent years, their applications have expanded to medium- and large-size applications such as power tools including electric tools, electric vehicles, and electric bicycles.

In particular, there are demands for a battery having a higher capacity for use in cellular phones, game machines, and the like that are increasingly smaller and provided with multiple functions, and research and development on an electrode active material that demonstrates a high charge and discharge capacity as a means thereof is on progress. Especially, as an ingredient of a negative electrode active material, attention has been given to materials such as silicon (Si) and tin (Sn) that can store and release larger amounts of lithium (ions) in place of a carbon material such as graphite used in conventional non-aqueous secondary batteries. Among others, $SiO^x$, which has a structure in which ultrafine Si particles are dispersed in $SiO_2$, has been reported as also having features such as excellent load characteristics (see Patent Documents 1 and 2).

However, it is known that since the aforementioned $SiO_x$ undergoes large volume expansion and contraction associated with a charge and discharge reaction, particles are pulverized for every charge and discharge cycle of a battery, resulting in problems such as an irreversible capacity increase due to a reaction between Si precipitated on the surface and a non-aqueous electrolyte solution, and battery expansion due to charge and discharge. Also, $SiO_x$ has a fine structure, and thus some effect is observed on improvement of the load characteristics of a battery, but there is still room for improvement on the point that $SiO_x$ itself is a poorly conductive material.

In view of this situation, techniques have been proposed of suppressing the volume expansion and contraction of $SiO_x$, which accompanies a charge and discharge reaction, by limiting $SiO_x$ utilization, improving load characteristics by coating the $SiO_x$ surface with a conductive material such as carbon, and improving the charge and discharge cycle characteristics of a battery using a non-aqueous electrolyte solution to which a halogen-substituted cyclic carbonate (such as 4-fluoro-1,3-dioxolan-2-one), vinylene carbonate, or the like is added (see Patent Document 3).

CITATION LIST

Patent Documents

Patent Document 1: JP 2004-47404A
Patent Document 2: JP 2005-259697A
Patent Document 3: JP 2008-210618A

DISCLOSURE OF THE INVENTION

Problem to be Solved by the Invention

However, with a non-aqueous secondary battery in which $SiO_x$ is used for the negative electrode, various properties required of a battery are not yet satisfied, and in particular, an improvement of storage characteristics has been a main challenge.

The present invention has been achieved in view of the above-described situation, and the present invention provides a non-aqueous secondary battery that has a high capacity and excellent storage characteristics.

Means for Solving the Problem

The non-aqueous secondary battery of the present invention has a positive electrode, a negative electrode, a non-aqueous electrolyte, and a separator, the negative electrode contains a negative electrode active material containing a graphitic carbon material and a composite in which a carbon coating layer is formed on a surface of a core material containing Si and O as constituent elements, the composite has a carbon content of 10 to 30 mass %, the composite has an intensity ratio $I_{510}/I_{1343}$ of a peak intensity $I_{510}$ at 510 cm$^{-1}$ derived from Si to a peak intensity $I_{1343}$ at 1343 cm$^{-1}$ derived from carbon of 0.25 or less when a Raman spectrum of the composite is measured at a laser wavelength of 532 nm, and the half-width of the (111) diffraction peak of Si is less than 3.0° when the crystallite size of an Si phase contained in the core material is measured by X-ray diffractometry using CuKα radiation.

Effects of the Invention

According to the present invention, a non-aqueous secondary battery that has a high capacity and excellent storage characteristics can be provided.

DESCRIPTION OF THE INVENTION

Figure 1A:
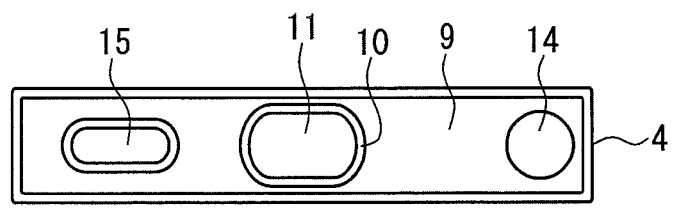
FIG. 1A is a plan view of the non-aqueous secondary battery of the present invention.

The non-aqueous secondary battery of the present invention has a negative electrode, a positive electrode, a non-aqueous electrolyte, and a separator. The configurations and structures of components other than the negative electrode are not particularly limited, and various configurations and structures that are used in heretofore-known non-aqueous secondary batteries are applicable. Below, the respective components of the non-aqueous secondary battery of the present invention will now be described in detailed.

(Negative Electrode)

For the negative electrode of the non-aqueous secondary battery of the present invention, usable is, for example, a negative electrode having a structure in which a negative electrode material mixture layer containing a negative electrode active material and a binder and if necessary a conductivity enhancing agent or the like is disposed on one side or both sides of a current collector.

The negative electrode active material used for the negative electrode of the non-aqueous secondary battery of the present invention contains a graphitic carbon material and a composite in which a carbon coating layer is formed on the surface of a core material containing Si and O as constituent elements.

The core material may be, in addition to an oxide of Si, a composite oxide formed by Si and another metal, or may contain Si and fine crystals or an amorphous phase of another metal. In particular, a material that has a structure in which a fine Si phase is dispersed in an amorphous $SiO_2$ matrix is preferably used. In this case, the core material is represented by a general compositional formula $SiO_x$ (provided that x is $0.5 \leq x \leq 1.5$). For example, in the case of a compound having a structure in which Si is dispersed in an amorphous $SiO_2$ matrix and the molar ratio of $SiO_2$ to Si is 1:1, the compositional formula is presented as SiO.

Below, $SiO_x$, which is a typical composition of the core material, will now be described in detailed.

Since $SiO_x$ has poor electric conductivity, a conductivity enhancing agent such as a carbon material is needed to use $SiO_x$ as a negative electrode active material. As described above, in the present invention, with the use of a composite in which a carbon coating layer is formed on the surface of $SiO_x$ (hereinafter referred to as an $SiO_x$/carbon composite) as a negative electrode active material, a conductive network in a negative electrode material mixture layer containing the negative electrode active material is more favorably formed than in the case where a material obtained by merely mixing $SiO_x$ and a conductivity enhancing agent such as a carbon material is used, and it is thus possible to enhance the load characteristics of a battery.

Moreover, in the present invention, (1) the amount and the state of carbon deposited on the surface of the core material and (2) the crystallite size of the Si phase in $SiO_x$ are optimized, and it is thus possible to enhance storage characteristics while maintaining the high-capacity characteristics. Below, a specific description will now be given.

Examples of $SiO_x$ that serves as the core material include, in addition to primary particles of $SiO_x$, $SiO_x$ composite particles containing various particles, a granulated body produced by granulating $SiO_x$ together with a carbon material to enhance the conductivity of the core material, and the like. As described above, coating the surface of such a core material with a carbon material produces effects, e.g., improvement of the load characteristics of a battery. In particular, in the case where the surface of a granulated body of $SiO_x$ and a carbon material is coated with a carbon material, even stronger effects can be expected.

An excessively small amount of carbon deposited on the surface of $SiO_x$ that serves as the core material results in a large decrease of post-storage capacity, and an excessively large amount does not make it possible to sufficiently demonstrate the advantages of $SiO_x$ having a large capacity. Therefore, the amount is preferably 10 to 30 mass % relative to the total amount of the $SiO_x$/carbon composite.

In the case where the surface of the core material is exposed, the capacity is likely to be decreased after storage, and therefore the higher the extent to which the core material is coated, the more preferable it is. It is preferable that the intensity ratio $I_{510}/I_{1343}$ of the peak intensity $I_{510}$ at 510 cm$^{-1}$ derived from Si to the peak intensity $I_{1343}$ at 1343 cm$^{-1}$ derived from carbon is 0.25 or less when the Raman spectrum of the $SiO_x$/carbon composite is measured at a measurement laser wavelength of 532 nm. It means that the smaller the intensity ratio $I_{510}/I_{1343}$, the higher the extent of carbon coating.

The Raman spectrum intensity ratio $I_{510}/I_{1343}$ is obtained by carrying out mapping measurement (measuring range: 80×80 μm, 2 μm step) on the $SiO_x$/carbon composite by microscopic Raman spectroscopy, and taking an average of all spectra within the measurement range to find the intensity ratio of the Si peak (510 cm$^{-1}$) to the C peak (1343 cm$^{-1}$).

Moreover, an excessively small crystallite size of the Si phase contained in the core material results in a large post-storage capacity decrease, and therefore it is sufficient that the half-width of the (111) diffraction peak of Si obtained by X-ray diffractometry using CuKα radiation is less than 3.0°, and preferably 2.5° or less. On the other hand, since an excessively large crystallite size of the Si phase results in a small initial charge and discharge capacity, the half-width is preferably 0.5° or greater.

It is desirable that the $SiO_x$/carbon composite content in the negative electrode active material is 0.01 mass % or greater and 20 mass % or less relative to the entire negative electrode active material. With the content being 0.01 mass % or greater, the effect of the use of $SiO_x$ for attaining a high capacity is favorably secured, and with the content being 20 mass % or less, the problem resulting from the volume change of $SiO_x$ in association with the repetitive charge and discharge of the negative electrode active material as a whole is favorably avoided, and it is thus possible to suppress capacity deterioration.

The average particle diameter of the $SiO_x$/carbon composite is preferably 0.5 to 20 μm. When the average particle diameter is 0.5 μm or less, the capacity after repetitive charge and discharge deteriorates, and when the average particle diameter is 20 μm or greater, negative electrode expansion caused by charge and discharge is large. The average particle diameter as referred to herein is a volume-based average particle diameter $D_{50}$ measured by, for example, dispersing fine particles in a medium in which resin does not dissolve using a laser scattering particle size distribution analyzer (such as "LA-920" manufactured by Horiba Ltd).

Examples of the carbon material for coating the surface of $SiO_x$ include low crystallinity carbon, carbon nanotube, vapor-grown carbon fiber, and the like.

For details of the carbon material, at least one member selected from the group consisting of fibrous or coiled carbon materials, carbon black (including acetylene black and Ketchen black), artificial graphite, soft carbon, and hard carbon is preferable. A fibrous or coiled carbon material is preferable in regard to the ease of forming a conductive network and having a large surface area. Carbon black (including acetylene black and Ketchen black), soft carbon, and hard carbon are preferable in regard to having high electrical conductivity and high liquid retentability as well as having properties that allow the carbon material to readily maintain contact with $SiO_x$ particles even when $SiO_x$ particles expand or contract.

In addition, for the carbon material, a graphitic carbon material that is used in combination with $SiO_x$ as a negative electrode active material can also be used. Similar to carbon black and the like, a graphitic carbon material also has high electrical conductivity and high liquid retentability and has properties that allow the carbon material to readily maintain contact with $SiO_x$ particles even when $SiO_x$ particles expand or contract, and therefore a graphitic carbon material can also be preferably used to form a composite with $SiO_x$.

Among the carbon materials presented above as examples, a fibrous carbon material is particularly preferable as a carbon material used in the case where the composite with $SiO_x$ is a granulated body. This is because a fibrous carbon material can conform to the expansion or contraction of $SiO_x$ that accompanies battery charging or discharging since it is in a thin thread-like form and has high flexibility, and can have a large number of junctions with $SiO_x$ particles since its bulk density is large. Examples of fibrous carbon include polyacrylonitrile (PAN)-based carbon fibers, pitch-based carbon fibers, vapor-grown carbon fibers, carbon nanotubes, and the like, and any of these may be used.

A fibrous carbon material can also be formed on the surface of $SiO_x$ particles by, for example, a vapor growth method.

The specific resistance of $SiO_x$ is usually $10^3$ to $10^7$ k$\Omega$cm, while the specific resistance of the carbon materials presented above as examples is usually $10^{-5}$ to $10$ k$\Omega$cm.

Moreover, the $SiO_x$/carbon composite may further have a material layer that covers the carbon coating layer on the particle surface (a material layer containing hard carbon).

In the $SiO_x$/carbon composite used for the negative electrode of the present invention, from the viewpoint of allowing the effect attained by creating a composite with a carbon material to be readily demonstrated, the proportion between $SiO_x$ and the carbon material is preferably 5 parts by mass or greater and more preferably 10 parts by mass or greater of the carbon material relative to 100 parts by mass of $SiO_x$. In the composite, an excessively large proportion of the carbon material for forming the composite with $SiO_x$ results in a decreased $SiO_x$ amount in the negative electrode material mixture layer, and the effect of attaining a high capacity is likely to be small. Therefore, the carbon material is preferably 50 parts by mass or less and more preferably 40 parts by mass or less relative to 100 parts by mass of $SiO_x$.

The $SiO_x$/carbon composite can be obtained by, for example, the following method.

First, a method for preparing $SiO_x$ that serves as the core material will now be described. $SiO_x$ can be obtained by, for example, a method in which a mixture of Si and $SiO_2$ is heated, and the generated silicon oxide gas is cooled for precipitation. Furthermore, thermally treating the resulting $SiO_x$ under an inert gas atmosphere enables formation of a fine Si phase inside the particles. At this time, adjusting the heat treatment temperature and time enables the half-width of the (111) diffraction peak of the formed Si phase to be controlled. Usually, the heat treatment temperature is in the range of about 900 to 1400° C., and the heat treatment time is set so as to be in the range of 0.1 to 10 hours.

Examples of $SiO_x$ include, in addition to primary particles of $SiO_x$ as stated above, $SiO_x$ composite particles, and a granulated body of $SiO_x$ and a carbon material. These examples are hereinafter also collectively referred to as "$SiO_x$ particles".

$SiO_x$ composite particles can be obtained by, for example, providing a dispersion in which $SiO_x$ is dispersed in a dispersion medium and spray-drying the dispersion. As a dispersion medium, for example, ethanol can be used. It is usually suitable to spray the dispersion in a 50 to 300° C. atmosphere.

A granulated body of $SiO_x$ and a carbon material can be obtained by granulating $SiO_x$ together with a carbon material using a mechanical method in which an oscillatory type or planetary type ball mill, rod mill, or the like is used.

Next, a method for preparing the $SiO_x$/carbon composite will now be described. For example, $SiO_x$ particles ($SiO_x$ composite particles, or a granulated body of $SiO_x$ and a carbon material) and hydrocarbon-based gas are heated in a gaseous phase, and carbon generated by the thermal decomposition of the hydrocarbon-based gas is deposited on the surface of the $SiO_x$ particles, thus preparing a $SiO_x$/carbon composite. Accordingly, a vapor growth (CVD) method allows hydrocarbon-based gas to reach throughout the composite particles and enables formation of a thin, uniform film containing a conductive carbon material, i.e., a carbon coating layer, on the particle surface and inside the surface pores, and it is thus possible with a small amount of a carbon material to impart uniform conductivity to $SiO_x$ particles.

The treatment temperature (ambient temperature) of the vapor growth (CVD) method varies according to the type of hydrocarbon-based gas, and a temperature of 600 to 1200° C. is usually suitable, in particular, a temperature of 700° C. or higher is preferable, and a temperature of 800° C. or higher is more preferable. This is because a higher treatment temperature creates a smaller amount of residual impurity and enables formation of a highly conductive carbon-containing coating layer.

As a liquid source of hydrocarbon-based gas, toluene, benzene, xylene, mesitylene, and the like can be used, but toluene, which is easy to handle, is particularly preferable. Hydrocarbon-based gas can be obtained by vaporizing these hydrocarbons (for example, bubbling with nitrogen gas). Also, it is possible to use methane gas, acetylene gas, and the like.

It is possible that after the surface of $SiO_x$ particles ($SiO_x$ composite particles, or a granulated body of $SiO_x$ and a carbon material) is coated with a carbon material by the vapor growth (CVD) method, at least one organic compound selected from the group consisting of petroleum-based pitch, coal-based pitch, thermosetting resin, and condensates of naphthalenesulfonates and aldehydes is adhered to the carbon material-containing coating layer, and then particles to which the organic compound is adhered are calcined.

Specifically, a dispersion in which $SiO_x$ particles ($SiO_x$ composite particles, or a granulated body of $SiO_x$ and a carbon material) whose surface is coated with a carbon material and the aforementioned organic compound are dispersed in a dispersion medium are provided, this dispersion is spray-dried to form particles coated with the organic compound, and the particles coated with the organic compound are calcined.

As the aforementioned pitch, isotropic pitch can be used. As the aforementioned thermosetting resin, phenol resin, furan resin, furfural resin, and the like can be used. As the condensate of a naphthalenesulfonate and an aldehyde, a naphthalenesulfonate formaldehyde condensate can be used.

As the dispersion medium for dispersing the $SiO_x$ particles ($SiO_x$ composite particles, or a granulated body of $SiO_x$ and a carbon material) whose surface is coated with a carbon material and the organic compound, for example, water and alcohols (such as ethanol) can be used. It is usually suitable to spray the dispersion in a 50 to 300° C. atmosphere. A calcination temperature of 600 to 1200° C. is usually suitable, in particular a temperature of 700° C. or higher is preferable, and a temperature of 800° C. or higher is more preferable. This is because a higher treatment temperature creates a smaller amount of residual impurity and enables formation of a highly conductive, high quality carbon material-containing coating layer. However, the treatment temperature needs to be equal to or lower than the melting point of $SiO_x$.

As the graphitic material used in combination with $SiO_x$ as a negative electrode active material, those that have been used for heretofore-known lithium ion secondary batteries are suitably used, and, for example, natural graphite such as flaky graphite; artificial graphite obtained by subjecting soft carbon such as pyrolytic carbon, mesocarbon microbeads (MCMB), and carbon fiber to a graphitization treatment at 2800° C. or higher; and the like are used.

For the binder used for the negative electrode material mixture layer, for example, polyvinylidene fluoride (PVDF), polytetrafluoroethylene (PTFE), styrene-butadiene rubber (SBR), carboxymethylcellulose (CMC), and the like are suitably used. Moreover, to the negative electrode material mixture layer, acetylene black and like various types of carbon black, carbon nanotube, carbon fiber, and the like may be added as conductivity enhancing agents.

To the negative electrode material mixture layer, a conductive material may be further added as a conductivity enhancing agent. Such a conductive material is not particularly limited as long as it does not undergo any chemical change in the non-aqueous secondary battery, and one or two or more materials can be used, such as carbon black (thermal black, furnace black, channel black, Ketchen black, acetylene black, and the like), carbon fiber, metal powder (powder of copper, nickel, aluminium, silver, and the like), metal fiber, and polyphenylene derivatives (those described in JP S59-20971A). Among these, it is preferable to use carbon black, and Ketchen black and acetylene black are more preferable.

As for the particle size of the carbon material used as a conductivity enhancing agent, it is preferable that the average particle size is, for example, 0.01 μm or greater and more preferably 0.02 μm or greater, and preferably 10 μm or less and more preferably 5 μm or less.

The negative electrode of the present invention is produced through steps of, for example, preparing a negative electrode material mixture-containing composition in a paste or slurry form in which a negative electrode active material and a binder and if necessity a conductivity enhancing agent are dispersed in a solvent such as N-methyl-2-pyrrolidone (NMP) or water (provided that the binder may be dissolved in the solvent), applying this composition to one side or both sides of a current collector, drying the composition, and then, if necessary, pressing the composition. However, the method for producing the negative electrode of the present invention is not limited to the above-described method, and may be produced by other production methods.

The thickness of the negative electrode material mixture layer is preferably 10 to 100 μm per side of the current collector. The density of the negative electrode material mixture layer is calculated from the mass and the thickness of the unit area of the negative electrode material mixture layer laminated on the current collector, and is preferably 1.0 to 1.9 g/cm$^3$. As for the composition of the negative electrode material mixture layer, for example, the amount of the negative electrode active material is preferably 80 to 99 mass %, the amount of the binder is preferably 1 to 20 mass %, and the amount of the conductivity enhancing agent, in the case where it is used, is preferably 1 to 10 mass %.

As the negative electrode current collector, copper or nickel foil, perforated metal, net, expanded metal, or the like can be used, but copper foil is usually used. In the case where the thickness of the entire negative electrode is reduced so as to obtain a battery having a high energy density, the upper limit of the thickness of the negative electrode current collector is preferably is 30 μm, and to secure mechanical strength, it is desirable that the lower limit of the thickness is 5 μm.

(Positive Electrode)

For the positive electrode of the non-aqueous secondary battery of the present invention, usable is, for example, a positive electrode having a structure in which a positive electrode material mixture layer containing a positive electrode active material, a binder, a conductivity enhancing agent, and the like are disposed on one side or both sides of a current collector.

As the positive electrode active material used for the positive electrode of the non-aqueous secondary battery of the present invention, an Li-containing transition metal oxide or the like capable of storing/releasing Li (lithium) ions is used. Li-containing transition metal oxides include those that have been used for heretofore-known non-aqueous secondary batteries such as lithium ion secondary batteries, and specific examples include $Li_yCoO_2$ (provided that $0 \leq y \leq 1.1$), $Li_zNiO_2$ (provided that $0 \leq z \leq 1.1$), $Li_eMVnO_2$ (provided that $0 \leq e \leq 1.1$), $Li_aCo_bM^1_{1-b}O_2$ (provided that $M^1$ is at least one metal element selected from the group consisting of Mg, Mn, Fe, Ni, Cu, Zn, Al, Ti, Ge, and Cr; $0 \leq a \leq 1.1$; and $0 < b < 1.0$), $Li_cNi_{1-d}M^2_dO_2$ (provided that $M^2$ is at least one metal element selected from the group consisting of Mg, Mn, Fe, Co, Cu, Zn, Al, Ti, Ge, and Cr; $0 \leq c \leq 1.1$; and $0 < d < 1.0$), $Li_fMn_{g-}Ni_hCO_{1-g-h}O_2$ (provided that $0 \leq f \leq 1.1$; $0 < g < 1.0$; and $0 < h < 1.0$), and like Li-containing transition metal oxides having a layer structure. Such oxides may be used singly, and two or more may be used as a combination.

As for the binder used for the positive electrode material mixture layer, binders that are the same as various binders presented above as examples of the binder for the negative electrode material mixture layer can be used.

Examples of the conductivity enhancing agent used for the positive electrode material mixture layer include graphite (graphitic carbon materials) such as natural graphite (flaky graphite and the like) and artificial graphite; carbon black such as acetylene black, Ketchen black, channel black, furnace black, lamp black, and thermal black; carbon fiber; and like carbon materials.

The positive electrode of the present invention is produced through steps of, for example, preparing a positive electrode material mixture-containing composition in a paste or slurry form in which a positive electrode active material, a binder, and a conductivity enhancing agent are dispersed in a solvent such as NMP (provided that the binder may be dissolved in the solvent), applying this composition to one side or both sides of a current collector, drying the composition, and then, if necessary, pressing the composition. However, the method for producing the positive electrode is not limited to the above-described method, and may be produced by other production methods.

The thickness of the positive electrode material mixture layer is preferably, for example, 10 to 100 μm per side of the current collector. The density of the positive electrode material mixture layer is calculated from the mass and the thickness of the unit area of the positive electrode material mixture layer laminated on the current collector, and is preferably 3.0 to 4.5 g/cm$^3$. As for the composition of the positive electrode material mixture layer, for example, the amount of the positive electrode active material is preferably 60 to 95 mass %, the amount of the binder is preferably 1 to 15 mass %, and the amount of the conductivity enhancing agent is preferably 3 to 20 mass %.

As for the current collector of the positive electrode, those that have been used for the positive electrode of heretofore-known non-aqueous secondary batteries can be used, and, for example, aluminium foil having a thickness of 10 to 30 μm is preferable.

In the present invention, it is desirable that P/N is 1.0 to 3.6, with P being the mass of the positive electrode active material and N being the mass of the negative electrode active material. With the upper limit of the P/N ratio being 3.6 or less, it is possible to reduce utilization of the negative electrode active material and thus limit charge capacity, thereby making it possible to suppress the volume expansion and contraction of the $SiO_x$/carbon composite during charging and discharging described above and prevent deterioration of cycle characteristics caused by particle pulverization or the like. Also, with the lower limit of the P/N ratio being 1.0 or greater, it is possible to secure a high battery capacity.

(Non-Aqueous Electrolyte)

An example of a non-aqueous electrolyte used for the non-aqueous secondary battery of the present invention may be an electrolyte solution prepared by dissolving an inorganic lithium salt or an organic lithium salt or both salts in a following solvent.

As the solvent, for example, aprotic organic solvents such as ethylene carbonate (EC), propylene carbonate (PC), butylene carbonate (BC), vinylene carbonate (VC), dimethyl carbonate (DMC), diethyl carbonate (DEC), methyl ethyl carbonate (MEC), γ-butyrolactone, 1,2-dimethoxyethane, tetrahydrofuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triesters, trimethoxy methane, dioxolane derivatives, sulfolane, 3-methyl-2-oxazolidinone, propylene carbonate derivatives, tetrahydrofuran derivatives, diethyl ether, and 1,3-propane sultone can be used singly or as a combination of two or more.

As the inorganic lithium salt, $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lower aliphatic carboxylic acid Li, $LiAlC_{14}$, LiCl, LiBr, LiI, chloroborane Li, tetraphenylboric acid Li, and the like can be used singly or as a combination or two or more.

As the organic lithium salt, $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ (2≤n≤7), $LiN(RfOSO_2)_2$ [where Rf is a fluoroalkyl group], and the like can be used singly or as a combination or two or more.

An electrolyte solution is preferably used in which $LiPF_6$ is dissolved in a solvent containing at least one chain carbonate selected from dimethyl carbonate, diethyl carbonate, and methyl ethyl carbonate, and at least one cyclic carbonate selected from ethylene carbonate and propylene carbonate.

A suitable lithium salt concentration in the electrolyte solution is, for example, 0.2 to 3.0 mol/dm$^3$, preferably 0.5 to 1.5 mol/dm$^3$, and more preferably 0.9 to 1.3 mol/dm$^3$.

In order to improve charge and discharge cycle characteristics and enhance safety such as high-temperature storability and overcharge prevention, for example, an acid anhydride, a sulfonic acid ester, dinitrile, 1,3-propane sultone, diphenyl disulfide, cyclohexylbenzene, vinylene carbonate, biphenyl, fluorobenzene, t-butylbenzene, a cyclic fluorinated carbonate [trifluoropropylene carbonate (TFPC), fluoroethylene carbonate (FEC), or the like], a chain fluorinated carbonate [trifluorodimethyl carbonate (TFDMC), trifluorodiethyl carbonate (TFDEC), trifluoroethyl methyl carbonate (TFEMC), or the like], or the like (including the derivatives of the respective compounds) can be suitably contained in the non-aqueous electrolyte solution. As described above, limiting the P/N ratio between the positive electrode and the negative electrode makes it possible to suppress particle pulverization caused by the volume expansion and contraction of the $SiO_x$/carbon composite, and addition of TFPC to the non-aqueous electrolyte solution allows formation of a film on the particle surface of the $SiO_x$/carbon composite, making it possible to suppress capacity deterioration caused by a charge and discharge cycle even in the case where a crack or the like is created in the particle surface due to repetitive charging and discharging and a newly formed surface is exposed, because the newly formed surface is coated again by the TFPC. Moreover, since TFPC has a higher level of anti-redox properties than FEC, TFPC is unlikely to cause excessive decomposition reactions (such as gas generation) other than the film forming reaction, suppressing exothermic reactions accompanying decomposition reactions, and thus it has a function to make a temperature increase inside the cell unlikely to occur.

(Separator)

The separator of the non-aqueous secondary battery of the present invention is preferably a separator that has sufficient strength and can retain a large amount of electrolyte solution, and a microporous membrane that has a thickness of 5 to 50 µm and an aperture ratio of 30 to 70% and that is made of a polyolefin such as polyethylene (PE) or polypropylene (PP) can be used. The microporous membrane constituting the separator may be a membrane that uses, for example, PE only or PP only, that may contain an ethylene-propylene copolymer, or that may be a laminate of a microporous membrane made of PE and a microporous membrane made of PP.

For the separator of the battery of the present invention, a laminated separator composed of a porous layer (A) primarily containing a resin having a melting point of 140° C. or lower and a porous layer (B) primarily containing a resin having a melting point of 150° C. or higher or an inorganic filler having an upper temperature limit of 150° C. or higher can be used. The term "melting point" as used herein refers to the melting temperature measured using a differential scanning calorimeter (DSC) in accordance with the Japanese Industrial Standard (JIS) K 7121, and the phrase "upper temperature limit of 150° C. or higher" means that deformation such as softening is not observed at a temperature of at least 150° C.

The porous layer (A) of the laminated separator is mainly to secure a shutdown function, and when the non-aqueous secondary battery reaches the melting point, or a higher temperature, of the resin that serves as the primary component of the porous layer (A), the resin of the porous layer (A) melts and blocks the pores of the separator, and causes shutdown that suppresses progress of an electrochemical reaction.

An example of the resin having a melting point of 140° C. or lower and serving as the primary component of the porous layer (A) may be PE, and examples of the configuration thereof include a microporous membrane for use in a lithium ion secondary battery, nonwoven fabric, and a like configuration in which PE particles are applied to a substrate. Here, relative to the entire components of the porous layer (A), the volume of the resin having a melting point of 140° C. or lower and serving as a primary component is preferably 50 volume % or greater and more preferably 70 volume % or greater. In the case where the porous layer (A) is formed of the aforementioned PE microporous membrane, the volume of the resin having a melting point of 140° C. or lower is 100 volume %.

The porous layer (B) of the laminated separator has a function to prevent a short circuit caused by direct contact between the positive electrode and the negative electrode also when the internal temperature of the non-aqueous secondary battery is increased, and this function is secured by the resin having a melting point of 150° C. or higher or the inorganic filler having an upper temperature limit of 150° C. or higher. That is, in the case where the battery reaches high temperatures, even when the porous layer (A) shrinks, a short circuit caused by a direct contact between the positive and negative electrodes, which can occur in the case where the separator thermally shrinks, can be prevented by the porous layer (B), which is unlikely to shrink. Also, because this heat resistant porous layer (B) serves as the backbone of the separator, the thermal shrinkage of the porous layer (A), i.e., the thermal shrinkage itself of the separator as a whole, can be suppressed.

For forming the porous layer (B) using primarily a resin having a melting point of 150° C. or higher, examples include a configuration in which a microporous membrane formed of a resin having a melting point of 150° C. or higher (for example, the foregoing PP-made microporous membrane for a battery) is laminated on the porous layer (A) and an application- and lamination-type configuration in which a resin having a melting point of 150° C. or higher is applied to the porous layer (A) for lamination.

Examples of the resin having a melting point of 150° C. or higher include crosslinked polymethyl methacrylate, crosslinked polystyrene, crosslinked polydivinylbenzene, styrene-divinylbenzene copolymer crosslinked products, polyimide, melamine resins, phenol resins, benzoguanamine-formaldehyde condensation products, and like various fine crosslinked polymer particles; PP, polysulfone, polyethersulfone, polyphenylene sulfide, polytetrafluoroethylene, polyacrylonitrile, aramid, polyacetal, and like heat resistant fine polymer particles.

The particle size, in terms of the average particle size $D_{50}$, of the resin having a melting point of 150° C. or higher is preferably, for example, 0.01 μm or greater and more preferably 0.1 μm or greater, and preferably 10 μm or less and more preferably 2 μm or less.

The amount of the resin having a melting point of 150° C. or higher is 50 volume % or greater relative to the total volume of the components of the porous layer (B) since the resin is contained as a primary component of the porous layer (B), preferably 70 volume % or greater, more preferably 80 volume % or greater, and even more preferably 90 volume % or greater.

For forming the porous layer (B) using primarily an inorganic filler having an upper temperature limit of 150° C. or higher, examples include an application- and lamination-type configuration in which a dispersion containing, e.g., an inorganic filler having an upper temperature limit of 150° C. or higher is applied to the porous layer (A) and dried to form the porous layer (B).

It is sufficient that the inorganic filler of the porous layer (B) has an upper temperature limit of 150° C. or higher, is stable against the non-aqueous electrolyte solution contained in the battery, and is electrochemically stable so as not to undergo redox in the operational voltage range of the battery, but it is preferable from the view point of, for example, dispersibility that the filler is fine particles, with alumina, silica, and boehmite being preferable. Alumina, silica, and boehmite have a high level of oxidation resistance, and it is possible to adjust their particle sizes and shapes so as to have, for example, desired numerical values, thus making it easy to precisely control the porosity of the porous layer (B). For the inorganic filler having an upper temperature limit of 150° C. or higher, the inorganic fillers presented above as examples may be used singly or as a combination of two or more. Alternatively, it is not problematic to use the inorganic filler in combination with the aforementioned resin having a melting point of 150° C. or higher.

The shape of the inorganic filler having an upper temperature limit of 150° C. or higher of the porous layer (B) is not particularly limited, and those that have various shapes such as a substantially spherical shape (including a perfectly spherical shape), a substantially spheroidal shape (including a spheroidal shape), and a plate shape can be used.

The average particle diameter $D_{50}$ of the inorganic filler having an upper temperature limit of 150° C. or higher of the porous layer (B) (The average particle diameter of a filler having a plate shape and a filler having another shape. The same applies hereinbelow.) is preferably 0.3 μm or greater and more preferably 0.5 μm or greater since an excessively small average particle diameter results in reduced ion permeability. Also, when the inorganic filler having an upper temperature limit of 150° C. or higher is excessively large, electrical characteristics are likely to be deteriorated, and thus the average particle diameter $D_{50}$ thereof is preferably 5 μm or less and more preferably 2 μm or less.

The amount of the inorganic filler having an upper temperature limit of 150° C. or higher in the porous layer (B) (in the case of being used in combination with the resin having a melting point of 150° C. or higher, the total amount of the resin and the inorganic filler is meant) is 50 volume % or greater relative to the total volume of the components of the porous layer (B) since the filler is contained as a primary component of the porous layer (B), preferably 70 volume % or greater, more preferably 80 volume % or greater, and even more preferably 90 volume % or greater. With the inorganic filler being contained in the porous layer (B) in a large amount as described above, the thermal shrinkage of the separator as a whole can be favorably suppressed even when the non-aqueous secondary battery reaches high temperatures, thus enabling generation of a short circuit by direct contact between the positive electrode and the negative electrode to be more favorably suppressed.

It is preferable that an organic binder is contained in the porous layer (B) in order to, for example, allow the resin particles having a melting point of 150° C. or higher or the inorganic filler particles having an upper temperature limit of 150° C. or higher to bind to each other or allow the porous layer (B) and the porous layer (A) to form a single body. Examples of the organic binder include ethylene-vinylacetate copolymers (EVAs, those having a structural unit derived from vinyl acetate of 20 to 35 mol %), ethylene-acrylic acid copolymers such as ethylene-ethyl acrylate copolymers, fluorine-based rubber, styrene-butadiene rubber (SBR), carboxymethylcellulose (CMC), hydroxyethylcellulose (HEC), polyvinyl alcohol (PVA), polyvinyl butyral (PVB), polyvinyl pyrrolidone (PVP), crosslinked acrylic resins, polyurethane, epoxy resins, and the like. In particular, heat resistant binders having an upper temperature limit of 150° C. or higher are preferably used. Organic binders presented above as examples may be used singly or used as a combination of two or more.

Among the organic binders presented above as examples, EVAs, ethylene-acrylic acid copolymers, fluorine-based rubber, SBR, and like binders that are highly flexible are preferable. Specific examples of such highly flexible organic binders include EVAs "EVAFLEX series" of Du Pont-Mitsui Polychemicals Co., Ltd., EVAs of Nippon Unicar Co., Ltd., ethylene-acrylic acid copolymers "EVAFLEX EEA series" of Du Pont-Mitsui Polychemicals Co., Ltd., EEAs of Nippon Unicar Co., Ltd., fluororubber "Daiel Latex series" of Daikin Industries, Ltd., SBR "TRD-2001" of JSR Corporation, SBR "BM-400B" of Zeon Corporation, and the like.

In the case where the aforementioned organic binder is used for the porous layer (B), it is sufficient that the organic binder is used in a dissolved form, or dispersed form, i.e., an emulsion, in a solvent of a composition for formation of porous layer (B), which will be described below.

The aforementioned application and lamination type separator can be produced by, for example, applying a composition for formation of porous layer (B) (for example, a liquid composition such as a slurry) containing, for example, the inorganic filler having an upper temperature limit of 150° C.

or greater to the surface of a microporous membrane for the porous layer (A) and drying the composition at a specific temperature to form the porous layer (B).

The composition for formation of porous layer (B) is a composition that contains, in addition to the inorganic filler having an upper temperature limit of 150° C. or higher, an organic binder or the like as necessary and in which these ingredients are dispersed in a solvent (including a dispersion medium). The same applies hereinbelow. It is possible that the organic binder is dissolved in a solvent. It is sufficient that the solvent used for the composition for formation of porous layer (B) can uniformly disperse the inorganic filler and other ingredients and can uniformly dissolve or disperse the organic binder. For example, toluene and like aromatic hydrocarbons; tetrahydrofuran and like furans; methyl ethyl ketone, methyl isobutyl ketone, and like ketones; and other generally used organic solvents are suitably used. To these solvents, alcohols (such as ethylene glycol and propylene glycol) or a variety of propylene oxide-based glycol ethers such as monomethyl acetate may be suitably added in order to control the surface tension. In the case where the organic binder is water soluble, in the case where the organic binder is used as an emulsion, or in a like case, water may be used as a solvent, and in this case also, it is possible to control the surface tension by suitably adding an alcohol (methyl alcohol, ethyl alcohol, isopropyl alcohol, ethylene glycol, or the like).

As for the composition for formation of porous layer (B), the content of solids including the inorganic filler having an upper temperature limit of 150° C. or higher, the organic binder, and the like is preferably, for example, 10 to 80 mass %.

In the aforementioned laminated separator, the porous layer (A) and the porous layer (B) each do not necessarily form a single layer, and multiple layers may be present in the separator. For example, the separator may have a configuration in which the porous layer (A) is disposed on both sides of the porous layer (B), or a configuration in which the porous layer (B) is disposed on both sides of the porous layer (A). However, since increasing the number of layers increases the thickness of the separator and possibly results in an increase of the internal resistance or a decrease of the energy density of the battery, it is not preferable to excessively increase the number of layers, and it is preferable that the total number of layers of the porous layer (A) and the porous layer (B) in the laminated separator is 5 or smaller.

The thickness of the separator (a separator composed of a microporous membrane made from a polyolefin, or the aforementioned laminated separator) of the non-aqueous secondary battery of the present invention is more preferably 10 to 30 µm.

In the laminated separator, the thickness of the porous layer (B) [in the case where the separator has multiple porous layers (B), the total thickness thereof] is preferably 3 µm or greater from the viewpoint of allowing each of the aforementioned effects of the porous layer (B) to be more effectively demonstrated. However, since an excessively thick porous layer (B) may result in a decreased energy density of the battery, the thickness of the porous layer (B) is preferably 8 µm or less.

In the laminated separator, the thickness of the porous layer (A) [in the case where the separator has multiple porous layers (A), the total thickness thereof] is preferably 6 µm or greater, more preferably 10 µm or greater from the viewpoint of allowing the aforementioned effects (in particular, a shutdown effect) of the use of the porous layer (A) to be more effectively demonstrated. However, an excessively thick porous layer (A) may result in, in addition to a decreased energy density of the battery, a decreased effect of inhibiting the thermal shrinkage of the entire separator because the power of the porous layer (A) to thermally shrink is increased. Therefore, the thickness of the porous layer (A) is preferably 25 µm or less, more preferably 18 µm or less, and even more preferably 16 µm or less.

The porosity of the separator as a whole in a dry state is preferably 30% or greater to secure the amount of electrolyte solution retained and to attain good ion permeability. On the other hand, from the view point of securing separator strength and preventing an internal short circuit, the porosity of the separator in a dry state is preferably 70% or less. The porosity P (%) of the separator can be found by calculating, from the thickness, the mass per area, and the density of a component of the separator, the sum of each component i using formula (1) below.

$$P = 100 - (\Sigma a_i/\rho_i) \times (m/t) \quad (1)$$

In formula (1) above, $a_i$ is the proportion of component i in mass %, $\rho_i$ is the density (g/cm$^3$) of component i, m is the mass per unit area (g/cm$^2$) of the separator, and t is the thickness (cm) of the separator.

In the case of the laminated separator, the porosity P (%) of the porous layer (A) can be found using formula (I) as shown above where m is the mass per unit area (g/cm$^2$) of the porous layer (A) and t is the thickness (cm) of the porous layer (A). The porosity of the porous layer (A) found by this method is preferably 30 to 70%.

Moreover, in the case of the laminated separator, the porosity P (%) of the porous layer (B) can be found using formula (1) as shown above where m is the mass per unit area (g/cm$^2$) of the porous layer (B) and t is the thickness (cm) of the porous layer (B). The porosity of the porous layer (B) found by this method is preferably 20 to 60%.

It is preferable that the separator has a high level of mechanical strength. For example, a piercing resistance of 3N or greater is preferable. As described above, since the negative electrode active material used in the non-aqueous secondary battery of the present invention undergoes large volume expansion and contraction during charging and discharging, in the present invention, the volume expansion and contraction is suppressed by limiting the P/N ratio to 1.0 to 3.6 in order to improve cycle characteristics. However, repetitive charge and discharge cycles bring about expansion and contraction of the negative electrode as a whole, thereby also mechanically damaging the separator that faces the negative electrode. With a separator having a piercing resistance of 3 N or greater, good mechanical strength is secured, and it is thus possible to alleviate the mechanical damage the separator receives.

An example of a separator having a piercing resistance of 3 N or greater may be the above-described laminated separator, and in particular, suitable is a separator in which a porous layer (B) primarily composed of an inorganic filler having an upper temperature limit of 150° C. or higher is laminated on a porous layer (A) primarily composed of a resin having a melting point of 140° C. or lower. This seems to be because the inorganic filler, having a high level of mechanical strength, compensates for the mechanical strength of the porous layer (A), thus enabling the mechanical strength of the separator as a whole to be enhanced.

The aforementioned piercing resistance can be measured by the following method. A separator is fixed to a plate having a hole with a 2-inch diameter so as not to create wrinkles or deflection. A hemispherical metal pin having a tip diameter of 1.0 mm is lowered toward the measurement sample at a rate of 120 mm/min, and the force at the time a hole is created in the separator is measured 5 times. Then, an average of 3 measurements excluding the largest value and the smallest value of the aforementioned 5 measurement values is taken, and this is regarded as the piecing resistance of the separator.

The aforementioned positive electrode, negative electrode, and separator can be used in the form of a laminated electrode body in which the positive electrode and the negative electrode are stacked, with the separator being disposed therebetween, or in the form of a rolled electrode body in which such a laminated electrode body is wound spirally in the non-aqueous secondary battery of the present invention.

Regarding the laminated electrode body and the rolled electrode body, in the case where the laminated separator is used, especially in the case where a separator in which a porous layer (B) primarily composed of an inorganic filler having a upper temperature limit of 150° C. or higher is laminated on a porous layer (A) primarily composed of a resin having an upper temperature limit of 140° C. or lower is used, it is preferable to dispose the separator such that at least the porous layer (B) faces the positive electrode. In this case, the porous layer (B) primarily composed of the inorganic filler that has an upper temperature limit of 150° C. or higher and that is more oxidation resistant faces the positive electrode, and thus the oxidation of the separator caused by the positive electrode can be suppressed. It is thus possible to enhance high-temperature storage characteristics and charge and discharge cycle characteristics of the battery. In the case where an additive such as vinylene carbonate or cyclohexylbenzene is added to the non-aqueous electrolyte solution, film formation may occur on the positive electrode side, thus blocking fine pores of the separator and significantly impairing the battery characteristics. Accordingly, a porous layer (B) having a relatively large number of pores is disposed so as to face the positive electrode, and thus an effect of suppressing blocking of fine pores can be also expected.

On the other hand, in the case where one side of the laminated separator is a porous layer (A), it is preferable that the porous layer (A) faces the negative electrode, thereby, for example, inhibiting a thermoplastic resin melted from the porous layer (A) during shutdown from being absorbed by the electrode mixture layer, and making it possible to use the thermoplastic resin to efficiently block the pores of the separator.

(Battery Configuration)

The configuration of the non-aqueous secondary battery of the present invention is not particularly limited. The non-aqueous secondary battery may take any configuration, for example, a coin, button, sheet, laminate, cylindrical, flat, or prismatic shape, and may have a large size for use in electric vehicles or the like. As described above, when the aforementioned negative electrode active material is used, the problem of battery expansion in particular is likely to occur in the case of a battery configured using an outer jacket in a prismatic shape (the shape of a rectangular prism) having a small thickness relative to the width, a flat outer jacket, a laminate film outer body, or the like, but with the battery of the present invention, generation of such battery expansion can be favorably suppressed, and therefore the effects of the battery of the present invention are demonstrated particularly significantly in the case of a prismatic battery or a flat battery having an outer body (outer jacket) as described above.

When installing a positive electrode, a negative electrode, and a separator in a non-aqueous secondary battery, a laminated electrode body in which multiple positive electrodes and multiple negative electrodes are stacked via a separator or a rolled electrode body in which a positive electrode and a negative electrode are stacked via a separator and wound spirally can also be used according to the configuration of the battery. When $SiO_x$ is used as a negative electrode active material, problems resulting from deformation such as a negative electrode volume change are likely to occur especially in the case of a rolled electrode body, but with a battery that uses the negative electrode of the present invention, i.e., the battery of the present invention, such deformation, e.g., a negative electrode volume change, can be favorably suppressed, and therefore the effect thereof is demonstrated particularly significantly in the case of a battery having a rolled electrode body (in particular, a rolled electrode body of which the cross-section perpendicular to the axis around which the components are wound is flat and that is used in a prismatic battery or a flat battery that uses a flat outer jacket, a laminate film outer body, or the like).

Having various good battery characteristics including charge and discharge cycle characteristics, the non-aqueous secondary battery of the present invention can be preferably used, while taking advantage of such characteristics, in various applications to which heretofore-known non-aqueous secondary batteries are applied, including a power source of a small multifunctional portable device.

EXAMPLES

Hereinafter, the present invention shall be described in detail with reference to examples. The present invention, however, is not limited to the examples presented below.

Example 1

Preparation of Positive Electrode

Positive electrode active materials, i.e., 70 parts by mass of $LiCoO_2$ and 30 parts by mass of $LiMn_{0.2}Ni_{0.6}Cu_{0.2}O_2$, conductivity enhancing agents, i.e., 1 part by mass of artificial graphite and 1 part by mass of Ketchen black, and a binder, i.e., 10 parts by mass of PVDF, were uniformly mixed in a solvent, i.e., NMP, to prepare a positive electrode mixture-containing paste. While adjusting the thickness, the positive electrode mixture-containing paste was applied intermittently to both sides of a current collector composed of aluminium foil having a thickness of 15 μm, dried, and then calendared to adjust the thickness of a positive electrode mixture layer such that the overall thickness was 130 μm, and cutting was performed so as to have a width of 54.5 mm, thereby preparing a positive electrode. Moreover, a tab was welded to an exposed portion of the aluminium foil of the positive electrode, thus forming a lead portion.

<Preparation of Negative Electrode>

98 parts by mass of a mixture in which a $SiO_x$/carbon composite having an average particle diameter $D_{50}$ of 5 μm and graphitic carbon having an average particle diameter $D_{50}$ of 16 μm were mixed in a mass ratio of 5:95; 1.0 part by mass of an aqueous CMC solution having a concentration of 1 mass % and a viscosity adjusted so as to be in the range of 1500 to 5000 mPa·s as a binder; 1.0 part by mass of SBR; and ion exchange water having a specific conductance of $2.0 \times 10^5$ Ω/cm or greater as a solvent were mixed, thus preparing a negative electrode mixture-containing aqueous paste.

Here, the amount of carbon coating in the $SiO_x$/carbon composite was 20 mass %, the intensity ratio $I_{510}/I_{1343}$ of the Raman spectrum at a measurement laser wavelength of 532 nm was 0.10, and the Si (111) diffraction peak half-width in X-ray diffraction measurement of $SiO_x$ using CuKα radiation was 1.0°.

While adjusting the thickness, the negative electrode mixture-containing paste was applied intermittently to both sides of a current collector composed of copper foil having a thickness of 8 µm, dried, and then calendared to adjust the thickness of the negative electrode mixture layer such that the overall thickness was 110 µm, and cutting was performed so as to have a width of 55.5 mm, thereby preparing a negative electrode. Moreover, a tab was welded to an exposed portion of the copper foil of the negative electrode, thus forming a lead portion.

<Preparation of Separator>

5 kg of ion exchange water and 0.5 kg of a dispersant (an aqueous polycarboxylic acid ammonium salt, a solid concentration of 40 mass %) are added to 5 kg of boehmite having an average particle diameter $D_{50}$ of 1 µm, and subjected to a disintegration treatment for 10 hours with a ball mill having an internal volume of 20 L at 40 revolutions/min, thus preparing a dispersion. The treated dispersion was dried under a vacuum at 120° C. and observed under a scanning electron microscope (SEM), showing that the boehmite had nearly a plate form.

0.5 g of xanthan gum as a thickener and 17 g of a resin binder dispersion (modified polybutyl acrylate, a solid content of 45 mass %) as a binder were added to 500 g of the dispersion, and stirred with a stirrer for 3 hours, thus preparing a uniform slurry [a slurry for formation of porous layer (B), a solid content of 50 mass %].

Next, a corona discharge treatment (a discharged amount of 40 W·min/m$^2$) was performed on one side of a PE microporous separator for lithium ion secondary battery [a porous layer (A): a thickness of 12 µm, a porosity of 40%, an average pore size of 0.08 µm, the melting point of PE of 135° C.], and the slurry for formation of porous layer (B) was applied to the treated surface by a microgravure coater and dried so as to form a porous layer (B) having a thickness of 4 µm, thus giving a laminated separator. The porous layer (B) in this separator had a mass per unit area of 5.5 g/m$^2$, a volume content of boehmite of 95 volume %, and a porosity of 45%.

<Preparation of Non-Aqueous Electrolyte Solution>

A mixed solvent in which EC, MEC, DEC, and VC were mixed in a volume ratio of 2:3:1:0.2, TFPC, and TFDMC were mixed in proportions of 30 volume %, 30 volume %, and 40 volume %, respectively, and LiPF$_6$ as a lithium salt was dissolved therein in a concentration of 1 mol/dm$^3$, thus preparing a non-aqueous electrolyte.

<Assembly of Battery>

The positive electrode and the negative electrode obtained as described above were placed one on top of the other, with the separator being placed therebetween such that the porous layer (B) of the separator faced the positive electrode, and wound spirally, thus preparing a rolled electrode body. The resulting rolled electrode body was pressed so as to have a flat shape, and placed in an aluminum alloy outer jacket having a thickness of 5 mm, a width of 42 mm, and a height of 61 mm. The non-aqueous electrolyte solution prepared as described above was poured in.

Figure 1B:
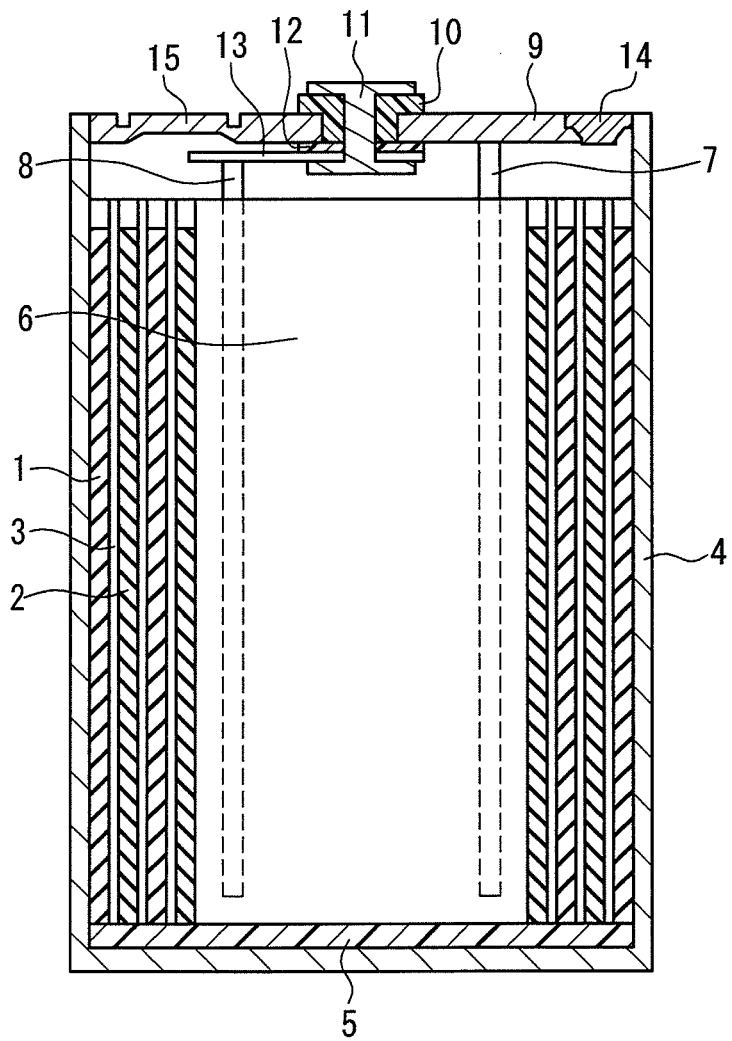
FIG. 1B is a cross-sectional view of the non-aqueous secondary battery of the present invention.
Figure 2:
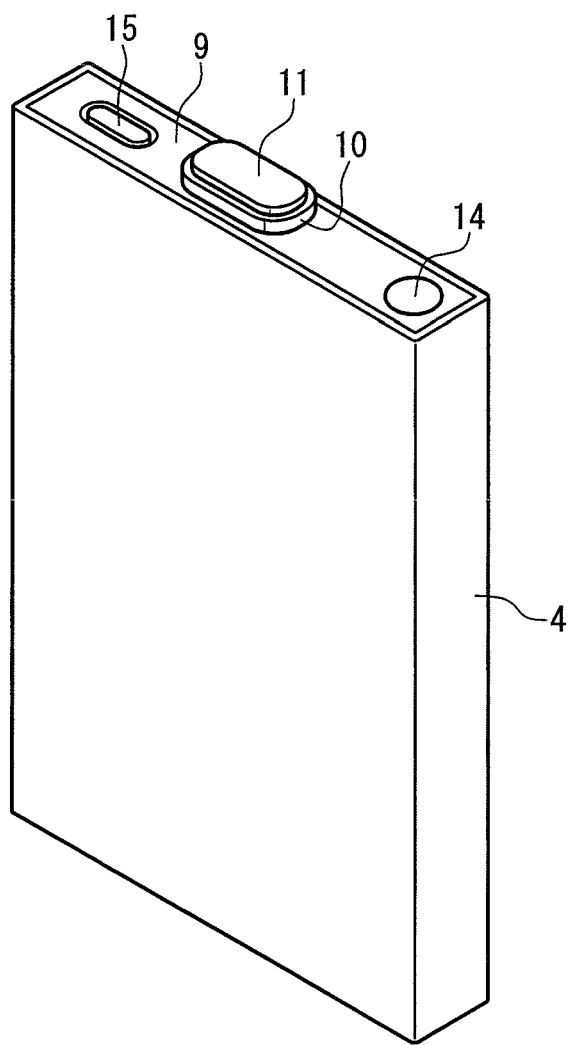
FIG. 2 is a perspective view showing the appearance of the non-aqueous secondary battery of the present invention.

After the non-aqueous electrolyte solution was poured in, the outer jacket was sealed, thus preparing a non-aqueous secondary battery having the structure shown in FIGS. 1A and 1B and the appearance shown in FIG. 2. This battery is provided with a release vent in the upper part of the jacket for lowering the pressure in the case where the internal pressure is increased.

Here, a description is given of the battery shown in FIGS. 1A and 1B and FIG. 2. FIG. 1A is a plan view and FIG. 1B is a cross-sectional view, and as shown in FIG. 1B, a positive electrode 1 and a negative electrode 2 are spirally wound, with a separator 3 being disposed therebetween, and then pressurized so as to attain a flat shape and are accommodated together with the non-aqueous electrolyte solution in a rectangular prism outer jacket 4 as a flat-shaped rolled electrode body 6. However, to avoid a complex drawing, the metal foil for a current collector, the electrolyte, and other components used in the preparation of the positive electrode 1 and the negative electrode 2 are not shown in FIG. 1B. Also, the layers of the separator are not shown distinguishably from each other.

The outer jacket 4 is made of an aluminum alloy and constitutes the outer body of the battery. This outer jacket 4 serves also as a positive terminal. An insulator 5 composed of a polyethylene (PE) sheet is disposed in the bottom of the outer jacket 4, a positive electrode lead element 7 and a negative electrode lead element 8 connected to one end of the positive electrode 1 and one end of the negative electrode 2, respectively, are drawn out of the flat-shaped rolled electrode body 6 composed of the positive electrode 1, the negative electrode 2, and the separator 3. A stainless steel terminal 11 is attached via a polypropylene (PP) insulating packing 10 to an aluminum alloy sealing cover plate 9 that seals the opening of the outer jacket 4, and a stainless steel lead plate 13 is attached to the terminal 11 via an insulator 12.

The cover plate 9 is inserted into the opening of the outer jacket 4, and the junction between these components is welded. Thereby the opening of the outer jacket 4 is closed, and the inside of the battery is hermetically sealed. In the battery of FIGS. 1A and 1B, a non-aqueous electrolyte solution inlet 14 is provided in the cover plate 9, and welding/sealing is carried out by, for example, laser welding while a sealing member is inserted in this non-aqueous electrolyte solution inlet 14, thus securing the airtightness of the battery. Accordingly, in the battery of FIGS. 1A and 1B and FIG. 2, the non-aqueous electrolyte solution inlet 14, although it actually serves as a non-aqueous electrolyte solution inlet as well as a sealing member, is presented as the non-aqueous electrolyte solution inlet 14 for the ease of description. Moreover, a release vent 15 is provided in the cover plate 9 as a mechanism that discharges internal gas to the outside when the temperature of the battery is increased.

In the battery of Example 1, the positive electrode lead element 7 is directly welded to the cover plate 9 and thus the outer jacket 4 and the cover plate 9 function as a positive terminal. The negative electrode lead element 8 is welded to the lead plate 13, and the negative electrode lead element 8 and the terminal 11 are electrically in connection via the lead plate 13, and thus the terminal 11 functions as a negative terminal. However, depending on the material or the like of the outer jacket 4, the positive and negative terminals of the battery may be inverted.

FIG. 2 is a perspective view showing the appearance of the battery shown in FIGS. 1A and 1B. FIG. 2 is provided to show that the battery is a prismatic battery, and FIG. 2 schematically shows the battery and shows only specific components of the battery. Also, in FIG. 1B as well, no hatching is provided that indicates a cross-section in the central portion of the rolled electrode body 6 or the separator 3.

Examples 2 to 4

Non-aqueous secondary batteries were produced entirely in the same manner as in Example 1 except that the amount of carbon coating of the negative electrode active material SiO$_x$/carbon composite, the intensity ratio $I_{510}/I_{1343}$ of the Raman spectrum, and the Si (111) diffraction peak half-width of the X-ray diffraction of $SiO_x$ were changed as presented in Table 1.

Comparative Examples 1 to 4

Non-aqueous secondary batteries were produced entirely in the same manner as in Example 1 except that the amount of carbon coating of the $SiO_x$/carbon composite, the intensity ratio $I_{510}/I_{1343}$ of the Raman spectrum, and the Si (111) diffraction peak half-width in the X-ray diffraction measurement of $SiO_x$ were changed as presented in Table 1.

The non-aqueous secondary batteries produced in Examples 1 to 4 and Comparative Examples 1 to 4 above were subjected to storage tests (25° C. storage and 45° C. storage) as described below. Results are shown in Table 2.

<25° C. Storage Test>

After constant current-constant voltage charging at a constant current of 1 C (corresponding to 1200 mA) and a constant voltage of 4.2 V (total charging time: 3 hours) was carried out at 25° C., constant current discharging at 1 C (discharge cutoff voltage: 2.7 V) was carried out, and the initial discharge capacity (mAh) was measured.

After the measurement of initial discharge capacity, the batteries were subjected to constant current-constant voltage charging at a constant current of 0.5 C (corresponding to 600 mA) and a constant voltage of 4.2 V (total charging time: 1 hour) at 25° C., and stored in a constant temperature bath at 25° C. for 7 days. After storage, constant current discharging at 1 C (discharge cutoff voltage: 2.7 V) was carried out.

To check the post-storage discharge capacity, after constant current-constant voltage charging at a constant current of 1 C (corresponding to 1200 mA) and a constant voltage of 4.2 V (total charging time: 3 hours) was carried out at 25° C., constant current discharging at 1 C (discharge cutoff voltage: 2.7 V) was carried out, and the post-storage discharge capacity (mAh) was measured. The ratio of the post-storage discharge capacity to the pre-storage discharge capacity was obtained as a capacity retention ratio.

<45° C. Storage Test>

This test was carried out entirely in the same manner as in the 25° C. storage test except that the temperature of the constant temperature bath for storage was 45° C.

TABLE 1

| | Amount (mass %) of carbon coating in the $SiO_x$/carbon composite | Intensity ratio $I_{510}/I_{1343}$ | Si (111) diffraction peak half-width (°) |
|---|---|---|---|
| Ex. 1 | 20 | 0.10 | 1.0 |
| Ex. 2 | 10 | 0.25 | 0.5 |
| Ex. 3 | 30 | 0.05 | 2.5 |
| Ex. 4 | 20 | 0.10 | 0.3 |
| Comp. Ex. 1 | 5 | 0.25 | 1.0 |
| Comp. Ex. 2 | 10 | 0.30 | 1.0 |
| Comp. Ex. 3 | 50 | 0.03 | 2.5 |
| Comp. Ex. 4 | 20 | 0.10 | 3.0 |

TABLE 2

| | Initial discharge capacity (mAh) | Capacity retention ratio (%) after storage at 25° C. for 7 days | Capacity retention ratio (%) after storage at 45° C. for 7 days |
|---|---|---|---|
| Ex. 1 | 1200 | 100 | 99 |
| Ex. 2 | 1195 | 100 | 98 |
| Ex. 3 | 1210 | 100 | 99 |
| Ex. 4 | 1120 | 100 | 99 |
| Comp. Ex. 1 | 1207 | 98 | 93 |
| Comp. Ex. 2 | 1205 | 98 | 94 |
| Comp. Ex. 3 | 1090 | 100 | 99 |
| Comp. Ex. 4 | 1215 | 98 | 94 |

The non-aqueous secondary batteries of Examples 1 to 4 in which the carbon content in the negative electrode active material $SiO_x$/carbon composite was 10 to 30 mass %, the intensity ratio $I_{510}/I_{1343}$ of the peak intensity $I_{510}$ at 510 cm$^{-1}$ derived from Si to the peak intensity $I_{1343}$ at 1343 cm$^{-1}$ derived from C in the Raman spectrum of the $SiO_x$/carbon composite was 0.25 or less, and the half-width of the X-ray diffraction peak of the (111) plane of the Si phase contained in the core material was less than 3.0° had a large initial discharge capacity, and excellent capacity retention ratios were obtained in the 25° C. and 45° C. storage. In particular, the non-aqueous secondary batteries of Examples 1 to 3 having a half-width of the X-ray diffraction peak of the (111) plane of the Si phase contained in the core material of 0.5° or greater had a large initial discharge capacity value.

In contrast, regarding Comparative Example 1 in which the carbon content in the $SiO_x$/carbon composite was less than 10 mass %, Comparative Example 2 in which the intensity ratio $I_{510}/I_{1343}$ exceeded 0.25, and Comparative Example 4 in which the half-width of the X-ray diffraction peak of the (111) plane of the Si phase contained in the core material was 3.0° or greater, the capacity retention ratio in the 45° C. storage was not good. Comparative Example 3 in which the carbon content in the $SiO_x$/carbon composite exceeded 30 mass % did not have a sufficient initial discharge capacity.

Accordingly, it is found that the carbon content in the $SiO_x$/carbon composite is preferably 10 to 30 mass %. Also, it is found that the intensity ratio $I_{510}/I_{1343}$ is preferably 0.25 or less. Also, it is found that the half-width of the X-ray diffraction peak of the (111) plane of the Si phase contained in the core material is preferably less than 3.0°, and more preferably 0.5° or greater and 2.5° or less.

The present invention can be reduced to practice in embodiments other than those described above without departing from the scope of the invention. Embodiments disclosed in this application are examples, and the present invention is not limited thereto. The scope of the present invention is indicated by the appended claims rather than by the foregoing description, and all changes which come within the meaning and range of equivalency of the claims are intended to be embraced therein.

INDUSTRIAL APPLICABILITY

Having a high capacity and excellent battery characteristics, the non-aqueous secondary battery of the present invention can be preferably used, while taking advantage of such characteristics, in various applications to which heretofore-known non-aqueous secondary batteries are applied, including a power source of a small multifunctional portable device.

LIST OF REFERENCE NUMERALS

1. Positive electrode
2. Negative electrode
3. Separator
4. Outer jacket
5. Insulator
6. Rolled electrode body
7. Positive electrode lead element
8. Negative electrode lead element
9. Sealing cover plate
10. Insulating packing
11. Terminal
12. Insulator
13. Lead plate
14. Non-aqueous electrolyte solution inlet
15. Release vent

The invention claimed is:

1. A non-aqueous secondary battery comprising a positive electrode, a negative electrode, a non-aqueous electrolyte, and a separator, the negative electrode comprising a negative electrode active material comprising a graphitic carbon material and a composite in which a carbon coating layer is formed on a surface of a core material comprising Si and O as constituent elements, the composite having a carbon content of 10 to 30 mass %, the composite having an intensity ratio $I_{510}/I_{1343}$ of a peak intensity $I_{510}$ at 510 cm$^{-1}$ derived from Si to a peak intensity $I_{1343}$ at 1343 cm$^{-1}$ derived from carbon of 0.25 or less when a Raman spectrum of the composite is measured at a laser wavelength of 532 nm, a half-width of a (111) diffraction peak of Si being less than 3.0° when a crystallite size of an Si phase contained in the core material is measured by X-ray diffractometry using CuKα radiation, and the positive electrode comprising a positive electrode active material comprising an Li-containing transition metal oxide represented by $Li_aCo_bM^1_{1-b}O_2$ where $M^1$ is at least one metal element selected from the group consisting of Mg, Mn, Fe, Cu, Zn, Al, Ti, Ge, and Cr, $0 \leq a \leq 1.1$, and $0 < b \leq 1.0$.

2. The non-aqueous secondary battery according to claim 1, wherein the positive electrode active material further comprises an Li-containing transition metal oxide represented by $Li_cNi_{1-d}M^2_dO_2$ where $M^2$ is at least one metal element selected from the group consisting of Mg, Mn, Fe, Co, Cu, Zn, Al, Ti, Ge, and Cr, $0 \leq c \leq 1.1$, and $0 < d < 1.0$.

3. The non-aqueous secondary battery according to claim 1, wherein P/N is 1.0 to 3.6, with P being mass of the positive electrode active material of the positive electrode and N being mass of the negative electrode active material of the negative electrode.

4. The non-aqueous secondary battery according to claim 1, wherein the non-aqueous electrolyte comprises a cyclic fluorinated carbonate.

* * * * *